March 24, 1970  D. S. CLEVELAND ET AL  3,502,857
MAGNETIC COMPASS

Filed Nov. 13, 1967  3 Sheets-Sheet 1

INVENTORS:
DONALD S. CLEVELAND
VICTOR J. ZALANSKAS
BY Thomson & Mrose
ATTORNEYS

March 24, 1970 D. S. CLEVELAND ET AL 3,502,857
MAGNETIC COMPASS
Filed Nov. 13, 1967 3 Sheets-Sheet 2

INVENTORS:
DONALD S. CLEVELAND
BY VICTOR J. ZALANSKAS

Thomson & Mrose
ATTORNEYS

March 24, 1970  D. S. CLEVELAND ET AL  3,502,857
MAGNETIC COMPASS

Filed Nov. 13, 1967  3 Sheets-Sheet 3

INVENTORS:
DONALD S. CLEVELAND
VICTOR J. ZALANSKAS
BY Thomson & Mrose
ATTORNEYS

---

United States Patent Office 3,502,857
Patented Mar. 24, 1970

---

3,502,857
MAGNETIC COMPASS
Donald S. Cleveland, 10 Museum Road, Beverly, Mass. 01915, and Victor J. Zalanskas, 311 Lynnfield St., Peabody, Mass. 01960
Filed Nov. 13, 1967, Ser. No. 682,272
Int. Cl. G01c 17/08; G01d 11/28; G09f 9/00
U.S. Cl. 240—2.1
6 Claims

ABSTRACT OF THE DISCLOSURE

A magnetic compass comprising a housing having a transparent cover and a dial member made of transparent material with indicia thereon mounted within the housing. A light source mounted within the housing behind the dial member and a masking plate having a dull non-reflective surface on the side confronting the dial member positioned between the light source and the dial member. The masking plate has a small light-transmitting portion therethrough so light from the light source will illuminate the dial member. A light-transmitting diaphragm member is positioned between the masking plate and the dial member forming a liquid-tight enclosure for the transparent liquid surrounding the dial member. The light source is mounted within a removable opaque cylindrical cartridge having a knob at one end and at least one small light transmitting portion therein.

BACKGROUND OF THE INVENTION

The present invention relates to improvements in direct-indicating instruments such as magnetic compasses, and, in one particular aspect, to novel and improved magnetic compasses of economical construction which are uniquely adjustable as to settings and illuminations while preserving hermetic sealing, and which are conveniently and comfortably readable even under adverse conditions of use.

Pivoted-magnet types of compasses constitute one of the oldest known aids to navigation, and have been exploited in equipments of vastly different sizes, complexities and accuracies. However, a number of important needs in certain classes of such devices have remained unsatisfied; in the case of compasses intended for use aboard small boats, for example, a prime concern has been that of ease and accuracy of setting and reading the compass under varying environmental conditions. For purposes of navigation at night, some form of internal illumination is desirable, although preferably the degree and kind of illumination should be controllable to conform with changing viewing conditions and with the different needs of individual users. An auxiliary adjustable light source introduces problems associated with preservation of seals against moisture and other contaminants, and, further, the provisions for efficient artificial internal illumination should not conflict with effective reading when ambient illumination or daylight might otherwise suffice. Mechanisms used for setting a course indicator should likewise not interfere with illumination, and should maintain the needed tight sealing.

SUMMARY

In accordance with certain of the present teachings, highly efficient illuminations of compass indications are achieved under both natural and artificial lighting conditions, with the latter being uniquely variable, through use of a transparent compass card separated from a contrasting background member and carrying semi-transparent indicia disposed for illumination from a light source below the card and from ambient impinging light. When a course-setting pointer is used, it may be selectably actuated from above the card and, from there, may be engaged with the card and adjusted without obstructing the desired illuminations.

It is one of the objects of the present invention, therefore, to improve the illumination of direct-indicating instruments by promoting the impingements of both natural and artificial lighting upon transparent indicators carrying semi-transparent markings.

Another object is to provide a unique magnetic compass of economical hermetically-sealed construction including advantageous provisions for adjustment and servicing of internal lighting and for setting a course indicator.

A further object is to provide an improved magnetic compass affording uncomplicated and unusually efficient illumination of its indicator card.

Still further, it is an object to provide a magnetic compass assembly readily lending itself to mounting in various positions and including a fully-sealed sub-assembly through which artificial lighting is directed into efficient illumination of a unique compass card which also responds particularly well to and can be accurately read via ambient lighting.

By way of a summary account of practice of this invention in one of its aspects, a transparent plastic card carrying compass markings is fixed with a vertically-pivoted magnet unit inside a transparent plastic dome which is part of a liquid-filled enclosure closed at the bottom by a somewhat flexible diaphragm of light-transmitting plastic material. A cup-shaped housing below the dome and supporting the liquid-filled enclosure is trunnioned with a U-shaped gimal which holds itself in place by spring action. Projecting substantially diametrically into the housing, at a position slightly below the level of the diaphragm, is a light-cartridge including a small electric light bulb within a cylindrical opaque tube, the latter having a shaped light-transmitting opening and a further opening covered by a filter, at different angular positions about its periphery. An O-ring seal about the cartridge is detented into a surrounding groove in the housing, such that the cartridge may be romavably snapped into position, and tight sealing against contaminants is preserved even during manipulated rotation of an external knob end of the cartridge for purposes of changing the illuminations by way of the tube openings. All surfaces visible through the dome are rendered opaque and substantially non-reflective, except for the card markings and a light-transmitting area which is disposed to admit light from the cartridge at angles avoiding glare to the viewer.

Although the features of this invention which are considered to be novel are set forth in the appended claims, further details as to preferred practices and as to the further objects and advantages thereof may be most readily comprehended through reference to the following description taken in connection with the accompanying drawings.

DESCRIPTION OF THE PREFERRED EMBODIMENTS

Figures 1, 3, 4, 5:
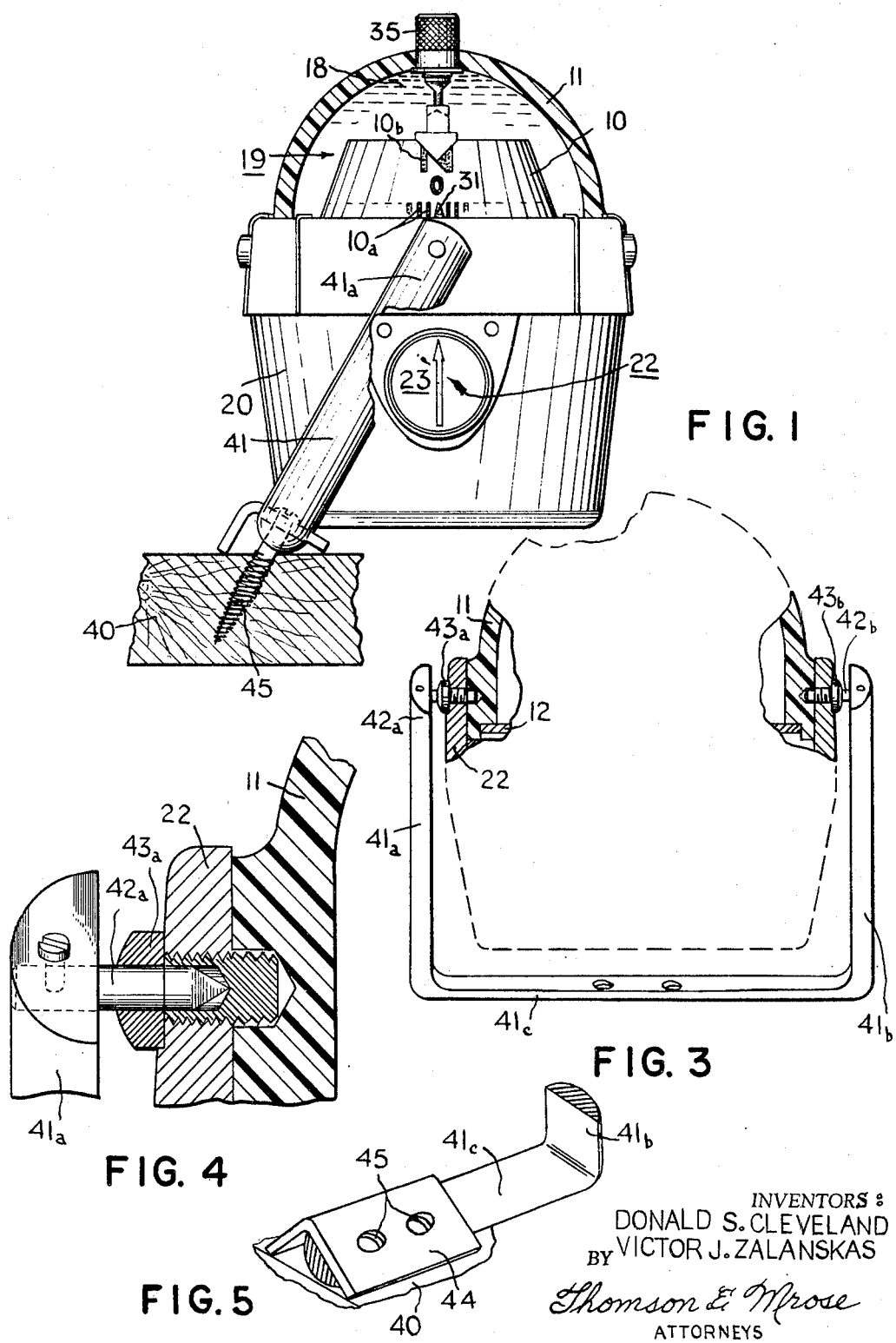
FIGURE 1 illustrates an improved gimbal-mounted compass assembly, partly in cross-section and with portions broken away to expose details.
FIGURE 3 depicts a gimbal and trunnion arrangement for the compass.
FIGURE 4 is an enlarged detail of a gimballing trunnion for the compass.
FIGURE 5 represents a mounting clip in association with the compass gimbal.
Figure 2:
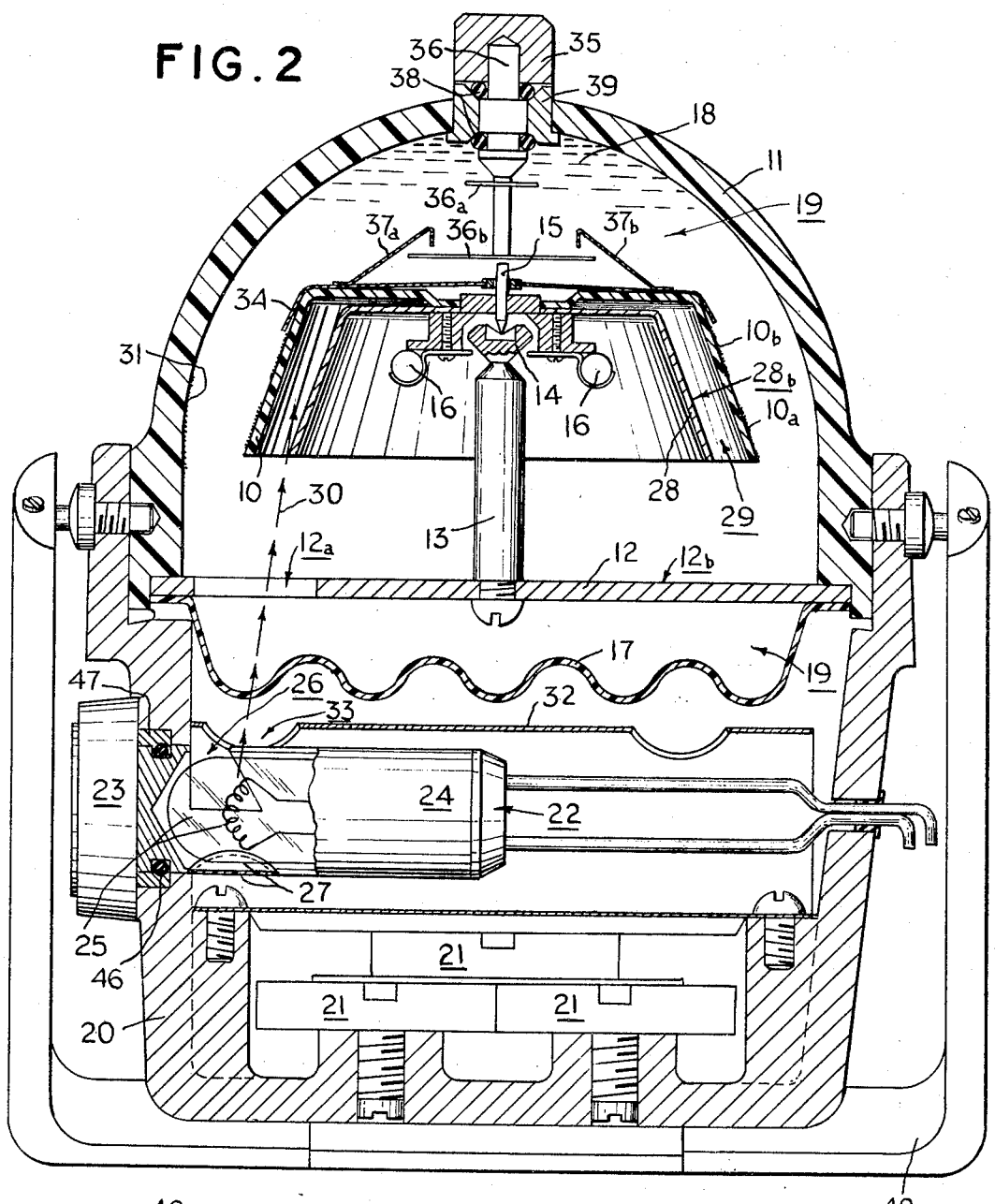
FIGURE 2 provides an enlarged front view, partly cross-sectioned, of the compass assembly of FIGURE 1.

The magnetic compass assembly appearing in FIGURES 1 and 2 is of a type intended for installation, aboard small boats and the like, in position for direct observation of its inverted-cup card or dial 10, through the enclosing transparent plastic hollow hemispherical dome 11. A rigid mounting plate 12 extends across the lower part of the dome, to serve as a support for a central post 13 upon which the pivot jewel 14 is set to cooperate with the central pivot 15 of the cup-card 10 and the usual pair of horizontal permanent magnets 16 which slave its angular position in alignment with the earth's magnetic field. Below the mounting plate, and in sealing relation to the dome and its enclosures, is a flexible light-transmitting plastic diaphragm 17, preferably having corrugations, as shown, permitting it to yield with expansions of the clear liquid 18 filling the unoccupied spaces 19 between the dome and diaphragm and the interior mechanisms. This liquid-filled sub-assembly is in turn partly set into the top of a mating hollow cup-shaped base 20 which contains the required adjustable compensating magnets 21 and, in addition, serves as a housing for a small angularly-adjustable and removable light cartridge 22. The latter is substantially cylindrical and includes a knob enlargement 23 at one end of a tubular opaque barrel 24 which normally extends substantially diametrically into the base through an opening in its side wall. A small electric light bulb 25 within the cartridge barrel is disposed to illuminate the compass dial 10 by way of light which it transmits vertically either through selectable portions of a triangular barrel aperture 26 or through part or all of a red filter 27 at a further windowed portion of the barrel.

Angular manipulations of knob 23 afford the light selections by turning appropriate windowed areas of the barrel to the topmost position where the light emissions will pass through the tarnsparent diaphragm 17, through the liquid filler 19 for the sub-assembly, and through the limited-area aperture 12$_a$ in plate 12 located just below a peripheral region of the dial 10. The amount of white light is desirably variable, via knob adjustments slecting different areas of the elongated variable-width aperture 26, depending upon ambient observation conditions, and the red-light illuminations through filter 27 are of course selected for certain night operations. Clear cup-card 10 advantageously appears to be essentially invisible within the liquid in which it is immersed, but its surface graduations 10$_a$ and compass heading markings 10$_b$ are clearly discernible either under ambient or artificial internal illuminations. These graduations and other markings are preferably of fluorescent and semi-transparent paint, and are of color, such as green, which makes them readily distinguishable from all background surfaces, such as those of plate surface 12$_b$, which is preferably a dull nonreflective black. Because the markings behind those few which it is desired to view on one part of the clear card at any time would tend to confuse the observations, a further opaque cup element 28, serving as a viewing shield, is disposed inside card 10; however a discrete annular spacing 29 is preserved between them, its radial width being sufficient to allow light rays such as 30 from lamp 25 to reach all of the card periphery which is intended to be illuminated. Refraction by the liquid also aids the light in reaching the card periphery, and is in a direction to minimize glare to the viewer. All visible external surfaces 28$_b$ of shield cup 28 are caused to be of the same non-reflective background surface character as the top of plate 12, preferably dull black. A fixed lubbers line or pointer 31 is shown to be painted on the inside of the dome in the path of the upwardly-transmitted light is well illuminated also, and preferably is of a different contrasting color, such as red, and comprises a semi-transparent fluorescent paint. Further masking of unwanted light from cartridge 24 is provided by an opaque shield 32 around the cartridge site, a circular opening 33 at the top permitting the desired light output to travel in the aforementioned upward paths. Strikingly, the indicia and pointer paint appear to "float" in position, without the clear supporting plastic parts being readily noticeable, and these markings are bright and clear against the dull dark background because of their semi-transparency and because of the good illumination received through the clear card 10 even from diffused ambient natural light. When a course-setting pointer, 34, is used, it may be conveniently adjusted from the top of the dome by a knob 35 fixed with a vertical shaft 36 provided with a stop 36$_a$ and a diametrically-extending lifter 36$_b$. This lifter may be elevated, with the knob, such that it engages and carries the spaced notched arms 37$_a$ and 37$_b$ of the lightweight pointer 34, raising the latter out of its frictional engagement with compass cup-card 10, the latter being trapped to prevent appreciable lifting. Angular adjustment of the knob then orients the set pointer at the desired relation to card 10, whereupon depression of the knob then drops the set pointer and leaves it engaged with the card. Elastomeric O-ring seals 38 between the knob shaft and a dome bushing 39 preserve liquid-tight sealing.

The sub-assembly and base combination is securely mounted with one degree of freedom relative to a support 40, such as a wooden part of a supporting craft, by a U-shaped lightweight metal gimbal 41. This gimbel exhibits a spring force between its arms 41$_a$ and 41$_b$ when they are spread apart to accommodate the compass housing between their inwardly-extending pivot pins 42$_a$ and 42$_b$. Because of the spring pressure and lateral flexibility of the gimbal arms, the pivots do not unintentionally become dislodged from the cooperating studs 43$_a$ and 43$_b$ affixed to base 22, even when violent motions occur. As is shown in FIGURES 3 and 4, the pivot pins are mated and journalled in the same studs used to secure the sub-assembly dome and base together. Taper of the pin ends is greater than that of the ends of the accommodating openings in the studs, such that friction is minimized. FIGURE 5 provides a detail clarifying how an axiliary angle-bracket 44 having openings matching those in the cross-member 41$_c$ of the gimbal conveniently facilitates securing of the gimbal to a support in a variety of positions by way of screws 45.

Figure 6:
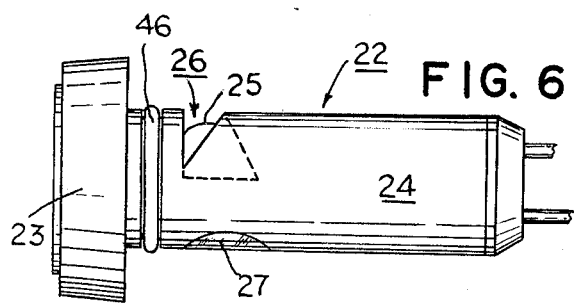
FIGURE 6 depicts a detached light cartridge unit, such as that employed in the assembly of FIGURES 1 and 2.
Figure 7:
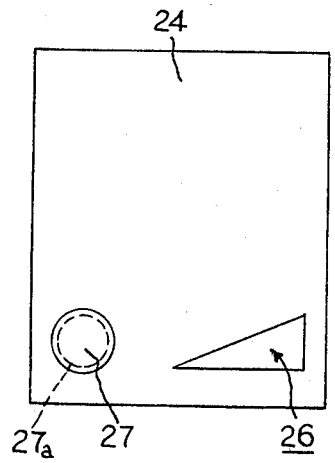
FIGURE 7 is a developed view, in flat form of the light-cartridge barrel, showing the light apertures and filter orientations.

Adjustable light cartridge 22 is shown withdrawn from the base in FIGURE 6, for convenient replacement of the bulb, for example. A reduced-diameter groove near the knob end is fitted with an elastomeric O-ring 46 of sufficient diameter to protrude slightly above the groove and to tend to lodge and axially detent itself firmly in a surrounding shallow groove in a base bushing 47. This detenting action holds the cartridge removably sealed in place despite vibration, and the entire cartridge nevertheless remains angularly adjustable for control of the artificial lighting. A development of the cartridge barrel 24 appears in FIGURE 7, clarifying the relationship between the triangular-shaped variable aperture 26 and spaced filter-window 27, the latter conveniently comprising a red plastic disk adhesively secured in place over a circular opening 27$_a$.

Figure 8:
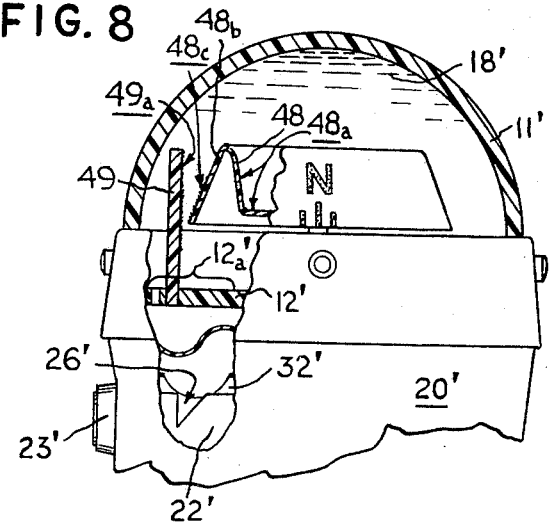
FIGURE 8 is a partly cross-sectioned illustration of an alternative cup-card unit in the compass assembly.

Although the desired background and masking for numerals, letters and indicia on cap-shaped card 10 in FIGURES 1 and 2 is afforded by the mated separate cup members 28, a preferred alternative embodiment in FIGURE 8 elininates that separate member and incorporates its functions in a single card 48 which is merely convoluted to present a back masking surface $48_a$, such as a dull non-reflective black painted surface, within the span inside the clear plastic rim $48_b$ carrying the semitransparent fluorescent-paint surface marking $48_c$. There, the mounting plate 12' is also of clear plastic, although painted to be dull and non-reflective and opaque, as by black painting $12_b'$, everywhere except at the site $12_a'$ of a circular region which transmits the desired lighting to the rim $48_b$ of the card 48. A fixed clear-plastic pointer 49 is provided in that embodiment, and projects through the mask plate 12' in region $12_b'$, such that light from below will be readily transmitted through it to the rear-surface semi-transparent fluorescent-painted index line $49_a$ on the side closer to the card rim. Other elements having functions corresponding to those of elements in FIGURES 1 and 2 are designated by the same reference characters, with distinguishing single-prime accents being added.

Figure 9:
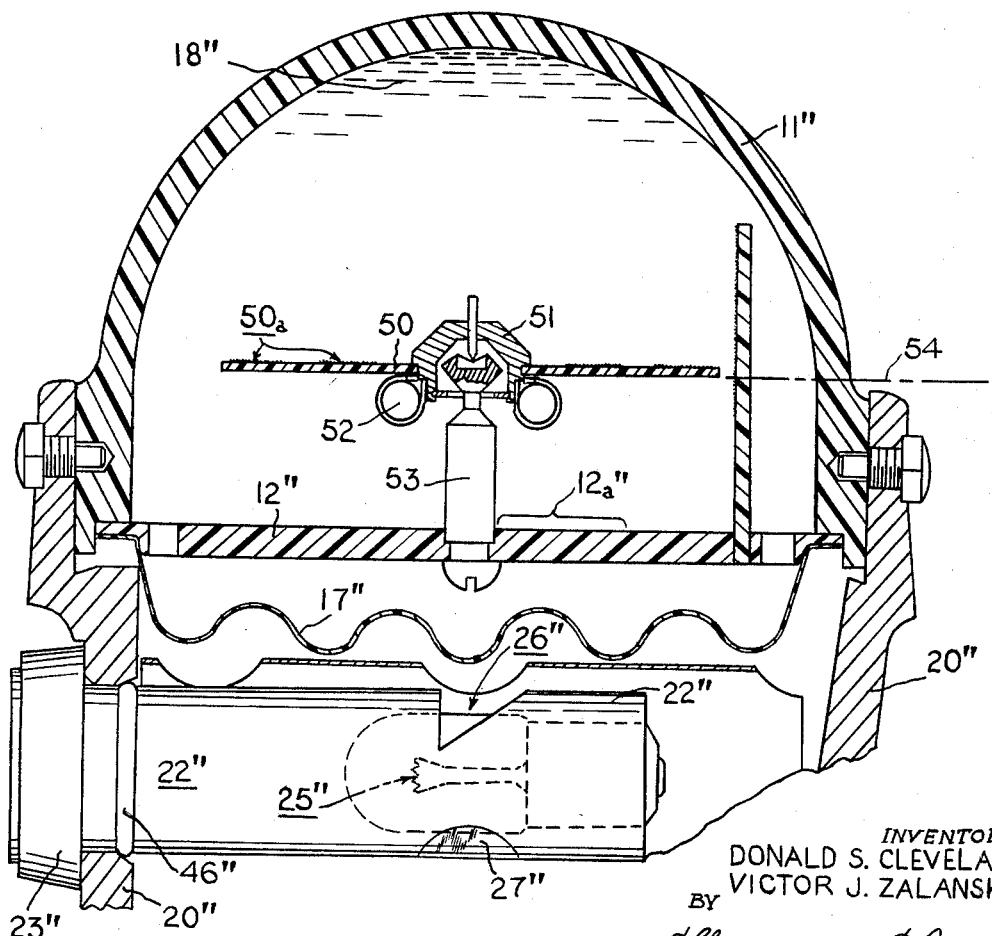
FIGURE 9 is a partly cross-sectioned portrayal of a preferred embodiment of compass assembly employing a flat card indicator.

The flat-card compass dial 50 in the further alternative preferred embodiment in FIGURE 9 is likewise of clear plastic, and bears upper surface markings $50_a$ of the semi-transparent fluorescent paint. Its hub structure 51 is painted a dull non-reflective black, as are also the attached pivoted magnet unit 52, the jewel support post 53, and most of the mounting plate 12″. In the latter connection, a relatively small circular region $12_a″$ of the painted clear plastic plate 12″ is left uncoated, to transmit light from the cartridge 22″ below to the rim of the card 50 at a forward viewing position. A pointer 49″, having a painted line $49_a″$, provides an index illuminated by the light passig through region $12_a″$. It will be noted that region $12_a″$ is eccentric in relation to the center of the card, and that the filament 25″ of the bulb within cartridge 22″ is radially displaced from this region. Further, the light-transmitting filter 27″ and variable-area aperture 26″ are similarly displaced in relation to both the filament and reigon $12_a″$, and, as a desirable result, there is no glare when the dome is viewed from directly above, as is commonly expected. The level 54 at which the card 50 is advantageously suspended is above the opaque upper rim of base 20″, such that ambient illumination will be transmitted well to the markings $50_a$, causing them to appear bright and clear at all times. In this instance, also other elements having functions corresponding to those of elements of FIGURES 1, 2 and 8 are for convenience designated by the same reference characters, with distinguishing double-prime accents being added.

The transparent liquid used in the indicators is selected to be light-stable and chemically neutral, and may, for example, be a so-called "white oil" such as that of Humble Oil Co. known as Bayol. Typically the clear dome and pointer elements may be fashioned of Lucite, the compass dial of a cellulose acetate butyrate material, and the diaphragm of a polyester such as Mylar which is substantially impervious to gases.

It sould be understood that the specific preferred embodiments and practices which have been depicted and described herein have been presented by way of disclosure rather than limitation, and those skilled in the art will appreciate that various modifications, combinations, substitutions, and alternative uses may be effected without departure from the spirit and scope of this invention in its broader aspetcs and as set forth in the accompanying claims.

What we claim as new and desire to secure by Letters Patent of the United States is:

1. An indicator arrangement comprising a dial member including transparent material carrying indicia thereon, a housing for said dial member including a transparent cover, means mounting said dial member within said housing in position for viewing from the outside through said cover and for impingement of ambient light thereon through said cover, a light source within said housing behind said dial member, a masking plate between said source and dial member and exhibiting on the side confronting the dial member dull non-reflective surfaces which visually contrasts with said indicia, said masking plate having a relatively small-area light-transmitting portion therethrough disposed behind one part of said dial member, means mounting said source in said housing in position to illuminate said part of said dial member through said light-transmitting portion of said plate, a light-transmitting diaphragm member between said source and dial member, means sealing said cover and diaphragm member in liquid-tight relationship and forming an enclosure with said dial member therein, a transparent liquid substantially filling said enclosure, said housing including a cup-shaped opaque base supporting said enclosure in closing relation to the open end thereof, and wherein said light source comprises a substantially cylindrical cartridge having a knob at one end fixed with a tubular opaque barrel having at least one relatively small-area light-transmitting portion, and a light bulb within said barrel, and means removably mounting said cartridge in said base with said knob external thereto.

2. An indicator arrangement as set forth in claim 1 wherein said means removably mounting said cartridge includes an elastomeric O-ring about a reduced-diameter portion of said barrel near said knob and protruding above the circumference of said barrel, and wall surfaces of said base defining a cylindrical opening therethrough having an inside groove of proportions releasably admitting said O-ring tightly therein and permitting rotation of said knob and barrel.

3. An indicator arrangement as set forth in claim 1 wherein said barrel has a variable-area light-transmitting opening therethrough having different widths angularly about said barrel.

4. An indicator arrangement as set forth in claim 3 wherein said barrel has a further light-transmitting portion therethrough including a red filter at an angular position different from that of said variable-area opening.

5. An indicator arrangement comprising an opaque housing having a transparent cover and indicator means therein, and removable illuminating means comprising a substantially cylindrical cartridge having a knob at one end fixed with a tubular barrel having at least one light-transmitting portion, a light bulb within said barrel, and an elastomeric O-ring about a reduced-diameter portion of said barrel near said knob and protruding above the circumference of said barrel, wall surfaces of said housing defining a cylindrical opening therethrough having an inside groove of proportions releasably admitting said O-ring tightly therein and permitting rotation of said knob and barrel.

6. An indicator arrangement as set forth in claim 5 wherein said barrel has a variable-area light-transmitting opening of different widths arcuately about one part of said barrel and a further light-transmitting portion therethrough including a light filter at another arcuate part of said barrel.

References Cited

UNITED STATES PATENTS

| | | | |
|---|---|---|---|
| 2,018,536 | 10/1935 | Salzgeber | 240—201 |
| 2,789,206 | 4/1957 | Le Van et al. | 240—2.1 |
| 2,903,798 | 9/1959 | Taylor | 33—223 |

NORTON ANSHER, Primary Examiner

R. M. SHEAR, Assistant Examiner

U.S. Cl. X.R.

33—223; 116—129